3,404,127
SIMULTANEOUS POLYMERIZATION AND
ALKYLATION OF ACRYLATE ESTERS
Ashot Merijan, Rahway, and Frederick Grosser, Midland Park, N.J., assignors to GAF Corporation, a corporation of Delaware
No Drawing. Filed Sept. 17, 1964, Ser. No. 397,298
20 Claims. (Cl. 260—47)

ABSTRACT OF THE DISCLOSURE

Monomers of acrylate esters of the formula $$CH_2=CHCOOR$$

wherein R is an alkyl of from 1 to 8 carbon atoms or an alkoxyalkyl in which the total number of carbon atoms in the alkyl is from 3 to 6 and comonomers of such acrylate esters with 1 to 95% by weight of a polymerizable monoethylenically unsaturated monomer, other than α-olefinic hydrocarbon and heterocyclic polymerizable monomer, are simultaneously polymerized and alkylated by heating one mole of said monomer or comonomers with 0.05 to 12 moles of at least one α-olefin of at least two carbon atoms as the alkylating agent in solution of an organic solvent common to said monomer, comonomers and α-olefin in the presence of 0.025 to 0.30 mole of an organic peroxide catalyst per mole of said α-olefin at a temperature ranging from 80° to 200° C., to form alkylated polymer in which at least some of the said monomer units constituting the polymer chain contain at least one alkyl group of at least two carbon atoms.

---

This invention relates to a new process of simultaneously polymerizing and alkylating acrylate esters whereby a range of polymers is obtained having solubility in a wide range of solvents, from polar to non-polar, and to a new and useful class of such polymers.

It is well known that polyacrylic esters are somewhat similar to methacrylic esters in solubility. It has been established that polyacrylic esters dissolve in aromatic hydrocarbons, ketones, esters, ether alcohols and ether esters, are swollen by ethers, but are insoluble in water, alcohols and aliphatic hydrocarbons including mineral oils.

Commercial requirements have arisen for homopolymers and copolymers of polyacrylic esters which are soluble in alcohols, aliphatic hydrocarbons, including mineral oils and other non-polar solvents.

To meet the needs of the foregoing requirements, it is the principal object of the present invention to provide a new process of simultaneously polymerizing and alkylating acrylate esters, i.e. acrylic ester monomers, alone, a mixture of two different acrylate esters or a mixture of an acrylate ester and non-heterocyclic monoethylenically unsaturated monomer so as to systematically control the solubility of the alkylated polymers. Thus, by the proper choice of alkylating agent (α-olefin) and the degree of alkylation, it is possible to prepare polymers which are soluble in polar solvents such as alcohols, ketones, esters, and in non-polar solvents such as aliphatic hydrocarbons of from 6 to 60 carbon atoms including isomers thereof, mineral and lubricating oils having a Saybolt viscosity of from 50 to 200 seconds, or polymers having intermediate degrees of solubility between polar and non-polar solvents. This systematic control of the solubility characteristics of the polymer is achieved without destroying the other desirable characteristics imparted by the vinyl ester configuration of the monomer or mixtures of monomers and thus polymers are readily prepared which overcome the solubility deficiencies noted above.

Other objects and advantages will become more clearly apparent from the following description:

We have found that acrylate ester monomers are readily polymerized and alkylated by treating 1 mole of such monomer alone, or 1 mole of a mixture of two different acrylate ester monomers, or 1 mole of a mixture consisting of an acrylate ester monomer and a non-heterocyclic polymerizable monoethylenically unsaturated monomer with 0.05 to 12 moles of an α-olefin in solution of an organic solvent common to the monomer, mixture of monomers and the α-olefin in the presence of 0.025 to 0.30 mole of an organic peroxide catalyst per mole of α-olefin at a temperature ranging from 80° to 200° C., for a period of time ranging from 3 to 60 hours. The resulting solution of polymerized and alkylated polymer may be employed as such or, if desired, the organic solvent may be removed by vacuum distillation. The degree of alkylation is determined by the amount of the α-olefin consumed and may range from as low as 1% to 90% by weight of the alkylated polymer. The solubility in polar solvents decreases and the solubility in non-polar solvents increases as the degree of alkylation increases. In other words, homopolymers and copolymers may be obtained in which some or all of the individual monomers or comonomers constituting the polymer contain one or more alkyl groups of at least two carbon atoms to as many carbon atoms as is contained in the α-olefin employed in the alkylation reaction. The average molecular weight of such homopolymers and copolymers varies from 50,000 to about 1,000,000.

The acrylate ester monomers which are simultaneously polymerized and alkylated with an α-olefin in accordance with the present invention are characterized by the following formula:

$$CH_2=CHCOOR$$

wherein R represents either a straight or branched alkyl of from 1 to 18 carbon atoms or an alkoxyalkyl in which the total number of carbon atoms in the alkyl groups range from 3 to 6. As examples of such acrylate esters the following are illustrative:

Acrylate:
| | |
|---|---|
| Methyl | Heptyl |
| Ethyl | 2-heptyl |
| Propyl | Octyl |
| Isopropyl | 2-octyl |
| Butyl | Nonyl |
| Isobutyl | 5-ethyl-2-nonyl |
| s-Butyl | Decyl |
| 2-methyl-1-butyl | 2-methyl-7-ethyl-4-undecyl |
| 3-methyl-1-butyl | Dodecyl |
| 2-ethyl-1-butyl | Tetradecyl |
| Amyl | Hexadecyl |
| 3-pentyl | Octadecyl |
| 2-methyl-1-pentyl | 2-methoxyethyl |
| 4-methyl-2-pentyl | 2-ethoxyethyl |
| Hexyl | 2-butoxyethyl |
| 2-ethylhexyl | |

In the simultaneous polymerization and alkylation of a mixture of comonomers containing from 5 to 95% by weight of any one of the foregoing acrylate ester monomers and from 1 to 95% by weight of a different acrylate ester monomer or from 1 to 95% by weight of a non-heterocyclic polymerizable monoethylenically unsaturated monomer the procedure is precisely the same as that described above.

The various non-heterocyclic polymerizable monoethylenically unsaturated monomers which are copolymerized with the acrylate ester monomers include vinyl acetate, vinyl methoxyacetate, vinyl diethyl acetate, vinyl trimethylacetate, vinyl propionate, vinyl isobutyrate, vinyl butyrate, vinyl lactate, vinyl caproate, vinyl caprylate, vinyl stearate, and methacrylic monomers such as methyl methacrylate, cyclohexyl methacrylate, isobutyl methacrylate, isoamyl methacrylate, β-methoxy ethyl methacrylate and α-(o-chlorophenyl) ethyl methacrylate, β-phenoxyethyl methacrylate, α-phenylethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-α-chloro-acrylate, ethyl-α-chloro acrylate, phenyl-α-chloro-acrylate, α-ethylacrylic acid, acrylonitrile, methacrylonitrile, acrylamide, methacrylamide, as well as N-alkyl and N-aryl substituted acrylamides. For the purpose of the present invention, the nature or character of the non-heterocyclic polymerizable monoethylenically unsaturated monomer is immaterial so long as such monomer is capable of copolymerization in any proportion with the acrylate ester monomer.

It is to be noted that a mixture of comonomers containing as low as 5% by weight of an acrylate ester monomer and 95% by weight of a non-heterocyclic polymerizable monoethylenically unsaturated monomer will contain sufficient methylene ($CH_2$) and methine ($CH$) groups including the alkyl groups characterized by R in the foregoing formula for alkylation during the simultaneous polymerization and alkylation reaction.

Any α-olefin having a molecular weight from about 28 to as high as 2500 may be employed in the alkylation of monomers of the above acrylate ester monomers, alone or in admixture during the simultaneous polymerization and alkylation reaction. In other words, α-olefins ranging from ethene, propene, 1-butene, 1-pentene, 2-ethyl-1-butene, 2-methyl-1-pentene, 1-hexene, 5-methyl-1-hexene, 2-methyl-1-pentene, 3-ethyl-1-pentene, 1-heptene, 1-octene, 1-nonene, 2-ethyl-1-hexene, 1-decene, 1-dodecene, 1-tetradecene, 1-hexadecene, 1-heptadecene, 1-octadecene, 1-nonadecene, 1-eicosene, 1-docosene, 1-tetracosene, 1-pentacosene to polybutenes of molecular weight of 400 to 2500 may be employed.

Instead of employing any one of the foregoing individual α-olefins, a mixture of commercially available linear α-olefins produced by cracking petroleum wax or by polymerizing lower olefins may also be used as the alkylating agent. The commercial product composition contains a mixture of linear olefins. Such mixture may contain linear olefins ranging from 6 to 8 carbon atoms, 8 to 10 carbon atoms, 10 to 12 carbon atoms, 12 to 16 carbon atoms, 16 to 20 carbon atoms and as high as 20 to 42 carbon atoms. For example, the product composition of linear heptene having 92% of mono-olefins, contains 89% of α-heptene, 6% of α-hexene and 5% of α-octene based on the mono-olefin basis. By careful distillation of the commercial product composition substantially individual α-olefins are obtained which may be used as the alkylating agent.

While linear α-olefins are preferred because of their commercial availability, we have found that the numerous isomers of α-olefins ranging from 1-pentene to 1-pentacosene as well as polybutenes may also be employed in the alkylation reaction. The only precaution required in such case is that the isomer contain an ethylenic unsaturation in the α-position thereof.

Instead of employing ethylene (ethene) as the alkylating agent, chloro-fluoro α-olefins such as for example dichlorovinylidene fluoride ($CCl_2=CF_2$), chlorovinylidene fluoride ($CHCl=CF_2$), chlorotrifluoroethylene ($CClF=CF_2$) tetrofluoroethylene ($CF_2=CF_2$), vinylidene fluoride ($CH_2=CF_2$) may be used to yield a series of new and useful polymers containing on the nitrogenous heterocyclic ring a fluoro or chlorofluoro ethane group.

In carrying out the simultaneous polymerization and alkylation reaction, an organic solvent common to the α-olefins; fluoro-α-olefins; chloro-fluoro-α-olefins, the acrylate ester monomer alone, a mixture of two different acrylate ester monomers, or a mixture of an acrylate ester monomer and a non-heterocyclic polymerizable monoethylenically unsaturated monomer should be employed. As solvents, we found that various alcohols such as methanol, ethanol, propanol, isopropanol, butanol, sec-butanol, amyl alcohol, hexanol, 2-ethyl-1-hexanol, ethylene glycol, 1,2-butanediol, 1,4-butanediol, etc. are very effective. Other solvents such as diacetone alcohol, diethylene glycol, ethylene glycol monomethyl ether acetate, methylene chloride and the like may also be employed. It is to be noted that the nature or character of the organic solvent is immaterial so long as it is a liquid, forms a solution with the acrylate ester monomers and polymers, the non-heterocyclic polymerizable monoethylenically unsaturated monomers and copolymers, the α-olefin and the fluoro and chloro-fluoro derivatives thereof and is less susceptible to alkylation than the aforementioned monomers and polymers.

The amount of organic solvent employed is not critical. Any amount which will yield a solution of the monomer, mixture of monomers, and α-olefin or the fluoro or chloro-fluoro derivatives thereof will suffice. However, for purposes of expediency, we found that for every part by weight of monomer, or a mixture of monomers from 2 to 10 parts of organic solvent either by volume or by weight, are sufficient to yield a workable solution.

As a peroxide catalyst (initiator) for the polymerization and alkylation reaction we can employ any one of the known organic peroxides normally employed as initiators in chemical reactions such as, for example, t-butyl-perbenzoate, di-benzoyl peroxide, benzoyl hydroperoxide, t-butyl hydroperoxide, t-butyl perphthalic acid, p-chlorobenzoyl peroxide, t-butyl peracetate, di-t-butyl peroxide, cumene peroxide, etc.

Where homopolymers and copolymers of a low degree of alkylation are desired, and a low molecular weight α-olefin is used, the simultaneous polymerization and alkylation reaction may be conducted in the presence of any one of the aforementioned alcohols.

Where it is desired that the alkylated homopolymer or copolymer be soluble in an aliphatic liquid hydrocarbon of 6 or more carbon atoms, a mineral oil or lubricating oil of a paraffinic stock, the simultaneous polymerization and alkylation reaction is preferably conducted in the presence of a higher boiling aliphatic alcohol such as for example hexanol, etc. When the desired degree of alkylation has been obtained the reaction mixture is subjected to vacuum distillation and the removed higher boiling alcohol is replaced by a saturated aliphatic hydrocarbon having a boiling point higher than the alcohol. After the alcohol has been removed there is obtained a solution of the alkylated polymer in solution of the aliphatic hydrocarbon. Saturated aliphatic hydrocarbons having a boiling point higher than hexanol are legion and commercially available. Hence, no difficulty should be encountered in the selection of such hydrocarbon in preparing a solution of the alkylated homopolymer or copolymer.

The only deviation from the foregoing procedure is where low-boiling α-olefins of from 2 to 6 carbon atoms and the fluoro- and chloro-fluoro α-olefins are employed as the alkylating agents. In such case the organic peroxide catalyst, preferably di-t-butyl peroxide, and the solution of the crylate ester monomer or a mixture of monomers are added into a stainless steel rocker bomb. The low-boiling α-olefin or fluoro- or chloro-fluoro α-olefin is then charged to the bomb and the bomb heated and maintained at a temperature of from 110° to 140° C. for a period of time ranging from 5 to 28 hours. The pressure developed in the bomb may range from 100–1000 p.s.i. After cooling to room temperature the contents of the bomb are discharged into any suitable vacuum distillation equipment to remove the solvent and the residual product recovered as a solid.

The following examples will show how the various acrylate ester monomers, alone or in admixture with other polymerizable monomers, are simultaneously polymerized and alkylated. All parts given are by weight unless otherwise noted.

For the sake of simplicity, the lubricating oil of paraffinic stock having a Saybolt viscosity of 100 seconds marketed by the Socony Mobil Oil Co. as "100 sec. solv." will be referred to hereinafter as "100 sec. solvent."

EXAMPLE I

Into a one liter, four-necked flask equipped with mechanical stirrer, thermometer, nitrogen inlet and reflux condenser, after a thorough nitrogen purge, there were added 92 grams (0.5 mole) of 2-ethylhexyl acrylate, 210 grams (0.75 mole) of α-eicosene, 120 grams of methyl isobutyl carbinol and 10 grams (initial amount) of di-t-butyl peroxide. The reaction mixture was heated to and held at 120–140° C. for 10 hours while maintaining a positive pressure of nitrogen on the system. After 10 hours an additional 5 grams of peroxide were added (a total of 15 grams or 0.1 mole) and the heating continued for another 10 hours. At the completion of this period the contents of the reaction mixture contained 4.35% unsaturation as α-eicosene corresponding to 19 grams of unreacted olefin (or 90.5% reacted). The reaction contents were then subjected to vacuum distillation and all the volatiles including the solvent (carbinol) removed. The residue which was a clear, light yellow liquid, weighed 300 grams and became a waxy solid on long standing at room temperature. The waxy solid was soluble in higher alcohols, ketones, carbon tetrachloride, mineral oils and other non-polar solvents such as benzene, xylene, etc.

EXAMPLE II

In an apparatus similar to that of Example I, there were charged 50 grams (0.5 mole) of ethyl acrylate, 100 grams of normal butanol, 273 grams (0.75 mole) of a mixture of α-olefins containing from 20 to 42 carbon atoms averaging to about 26 carbon atoms with an average molecular weight of 364 as marketed by Gulf Oil Corporation, and 10 grams (initial) of di-t-butyl peroxide.

The system was flushed with nitrogen and heated. After maintaining the contents at 120–140° C. for 16 hours, an additional 7.0 grams peroxide (total=17 grams, 0.116 mole) was added and the alkylation mixture held at the same conditions for another 14 hours. The contents were then cooled, analyzed and found to contain 4.1% unsaturation by weight based on a molecular weight of 364 or corresponding to 18 grams of unreacted olefin. As the final product was desired as an oil solution, the solvent was stripped in vacuum and 323 grams 100 sec. solv. added to the residue and well mixed. The clear 50% oil solution was discharged while warm. The discharged product weighed 626 grams vs. 646 grams expected.

EXAMPLE III

In an apparatus similar to that described in Example I, there were charged 70 grams (0.7 mole) of ethyl acrylate, 30 grams (0.3 mole) of methyl methacrylate, 280 grams (1.0 mole) of α-eicosene, 150 grams of normal butanol and 15 grams (0.1 mole) of di-t-butyl peroxide.

The flask was purged with nitrogen and then stirred and heated. The contents were maintained at reflux (120–126° C.) for 16 hours and then another 5.0 grams peroxide was added (total=20 grams, 0.13 mole) and the reaction continued for 8 more hours (total=24 hours) and then cooled and analyzed. The analysis showed the total absence of the acrylate or the methylate monomers and 5.7% by weight as α-eicosene, corresponding to only 31 grams unreacted eicosene. Then as the solvent was stripped in vacuum, 380 grams 100 sec. solv. was added. At the completion of stripping and cooling to room temperature the 50% product solution was clear, fluid and weighed 756 grams.

EXAMPLE IV

Into a one liter, four-necked flask equipped with mechanical stirrer, thermometer, nitrogen inlet and reflux condenser, after a thorough nitrogen purge, there were added 128.0 grams (1.0 mole) of sec-butyl acrylate, 224.0 grams (1.0 mole) of alpha hexadecene, 150 grams of normal butanol and 29.0 grams (0.22 mole) of t-butyl peracetate.

The contents were heated and maintained at 110–125° C. for twelve hours with a continuous mild nitrogen pressure on the system. The reaction mixture at the end of this period was analyzed and found to constitute no residual monomeric acrylate and only 6.98% alpha hexadecene by weight of the solution (37.0 grams) corresponding to 83.5% reaction based on the olefin. As the product was needed as an oil solution, the solvent was stripped in vacuum and simultaneously 352 grams of 100 sec. solvent was added into the flask such that the final product was obtained as a light colored fluid, weighing 700 grams.

EXAMPLE V

Into a one liter, four-necked flask equipped with mechanical stirrer, thermometer, nitrogen inlet and reflux condenser, after a thorough nitrogen purge, there were added 113.5 grams (0.8 mole) of amyl acrylate, 41.2 grams (0.2 mole) of β-phenoxyethyl methacrylate, 200 grams of hexanol and 252.0 grams (1.0 mole) of α-octadecene, and 15.0 grams (0.1 mole-initial) of di-t-butyl peroxide.

The contents were maintained at 120–140° C. for sixteen hours and then 7.0 more grams peroxide were added (total=22.0 grams, 0.15 mole) and the reaction continued for a total of thirty hours and then cooled and analyzed for residual monomers. It contained no remaining acrylate or methacrylate but 5.1% α-octadecene by weight of solution corresponding to 32 grams of the olefin only. (87.3% reaction based on the olefin.) The alkylated copolymer, after the total removal of the solvent in vacuum, was a viscous colorless fluid soluble in mineral oils and hydrocarbons.

EXAMPLE VI

Into a one liter, four-necked flask equipped with mechanical stirrer, thermometer, nitrogen inlet and reflux condenser, after a thorough nitrogen purge, there were added 78.0 grams (0.5 mole) of hexyl acrylate, 56.5 gram (0.5 mole) of N-isopropyl acrylamide, 200 grams of methyl isobutyl carbinol, 245 grams (1.25 mole) of α-tetradecene and 15 grams (0.1 mole) of di-t-butyl peroxide.

The contents were maintained at 120–145° C. for six hours and then a second addition of 15.0 grams of peroxide was made (total=30.0 grams, 0.2 mole) and reaction continued for sixteen more hours. Analysis for residual monomers showed no trace of the acrylates but 5.42% by weight residual α-tetradecene corresponding only to 33.0 grams, or an 86.5% alkylation based on olefin.

The product after the total removal of solvent and volatiles was a colorless viscous mass soluble in alcohols, hydrocarbons, ketones and other common organic solvents.

EXAMPLE VII

Into a one liter, four-necked flask equipped with mechanical stirrer, thermometer, nitrogen inlet and reflux condenser, after a thorough nitrogen purge, there were added 114.0 grams (1.0 mole) of isopropyl acrylate, 150 grams of ethyl alcohol and 25.0 grams (0.25 mole) of t-butyl hydroperoxide (90%).

The bomb was then capped, cooled and through an injection valve 135 grams (2.41 mole) of 1-butene injected and the valve shut. The bomb was next heated and maintained at 125–140° C. for 16 hours with shaking. After cooling and venting the bomb, the contents were transferred into a 500-ml. three-necked flask and heated to reflux to remove any dissolved unreacted butene. The degassed solution based on material balance had gained 107 grams in butene. The solution was then placed in stainless steel trays and dried in vacuum oven at 100° C. The final product obtained was 98.5% solids, weighed 215 grams and was of flexible nature. It was soluble in a wide variety polar and non-polar solvents both.

From the foregoing specification and illustrative working examples it becomes clearly evident that by the simultaneous polymerization and alkylation process of the present invention the solubility of the polymers, homo- and co-polymers, can be systematically controlled, both by the type of α-olefin used and the amount thereof, so that polymers which are still soluble in polar solvents, such as alcohols to polymers which are soluble in aliphatic hydrocarbons, mineral and lubricating oils can be obtained as well as polymers having intermediate degrees of solubility between polar and non-polar solvents. Thus, polymers with a low degree of alkylation are still soluble in ethanol, so that they can be formulated with "Freons" as aerosol hair sprays, but their sensitivity to moisture is reduced. These polymers can also be formulated into adhesives with superior properties because of their increased resistance to moisture. Polymers with a high degree of alkylation are soluble in hydrocarbon liquids and liquid petroleum products. When dissolved in kerosenes, jet fuels, furnace oils and similar combustible liquids at a concentration from about 0.001% to 2% by weight, they provide effective protection against deposition or separation of gums, resins and sludges. They are effectively useful as viscosity index improvers and as gum resin and sludge dispersants in lubricating oils. When dissolved in lubricating oils at a concentration from about 0.03% to 5% by weight they readily disperse gums, resins and sludges which may form and thus prevent their deposition on engine parts. The homopolymer and copolymer alkylates of α-olefins of from 8 to 42 carbon atoms are a new class of products and are especially useful as dispersants for engine oils since they leave no deposit, i.e., they are ashless.

The homopolymer and copolymer alkylates of chlorofluoro-α-olefin and fluoro-α-olefin of 2 carbon atoms are a new and useful class of products having fire-retardant properties. They are especially useful in the formulation of fire-retardant adhesives, i.e., bonding agents for paper, plastics and textile fabrics. From solutions in a variety of organic solvents or as emulsions, the polymers form smooth continuous films which make them particularly useful as fire-retardant precoating agents for polyester laminates.

We claim:

1. The process of simultaneously copolymerizing and alkylating acrylate ester monomers which comprises heating one mole of a monomer selected from the class consisting of at least one acrylate ester monomer of the formula $CH_2=CHCOOR$ wherein R is selected from the group consisting of alkyl of from 1 to 18 carbon atoms and alkoxyalkyl in which the total number of carbon atoms in the alkyl groups is from 3 to 6 and a mixture of monomers containing from 5 to 99% by weight of said acrylate ester monomer and from 1 to 95% by weight of a non-heterocyclic and non-α-olefinic hydrocarbon polymerizable monoethylenically unsaturated monomer with 0.05 to 12 moles of at least one α-olefin of at least 2 carbon atoms as the alkylating agent in solution of an organic solvent common to said acrylate ester monomer, mixture of monomers and α-olefin in the presence of 0.025 to 0.30 mole of an organic peroxide catalyst per mole of said α-olefin at a temperature ranging from 80° to 200° C., to form alkylated polymer in which at least some of the said monomer units constituting the polymer chain contain at least one alkyl group of at least two carbon atoms.

2. The process of simultaneously copolymerizing and alkylating 2-ethylhexyl acrylate which comprises heating one mole of 2-ethylhexyl acrylate with 0.05 to 12 moles of at least one α-olefin of at least 2 carbon atoms as the alkylating agent in solution of an organic solvent common to said 2-ethylhexyl acrylate and α-olefin in the presence of 0.025 to 0.30 mole of an organic peroxide catalyst per mole of said α-olefin at a temperature ranging from 80° to 200° C.

3. The process of simultaneously copolymerizing and alkylating ethyl acrylate which comprises heating one mole of ethyl acrylate with 0.05 to 12 moles of at least one α-olefin of at least 2 carbon atoms as the alkylating agent in solution of an organic solvent common to said ethyl acrylate and α-olefin in the presence of 0.025 to 0.30 mole of an organic peroxide catalyst per mole of said α-olefin at a temperature ranging from 80° to 200° C.

4. The process of simultaneously copolymerizing and alkylating sec-butyl acrylate which comprises heating one mole of sec-butyl acrylate with 0.05 to 12 moles of at least one α-olefin of at least 2 carbon atoms as the alkylating agent in solution of an organic solvent common to said sec-butyl acrylate and α-olefin in the presence of 0.025 to 0.30 mole of an organic peroxide catalyst per mole of said α-olefin at a temperature ranging from 80° to 200° C.

5. The process of simultaneously copolymerizing and alkylatnig isopropyl acrylate which comprises heating one mole of isopropyl acrylate with 0.05 to 12 moles of at least one α-olefin of at least 2 carbon atoms as the alkylating agent in solution of an organic solvent common to said isopropyl acrylate and α-olefin in the presence of 0.025 to 0.30 mole of an organic peroxide catalyst per mole of said α-olefin at a temperature ranging from 80° to 200° C.

6. The process of simultaneously copolymerizing and alkylating one mole of a mixture of monomers containing 0.8 mole of amyl acrylate and 0.2 mole of β-phenoxyethyl methacrylate which comprises heating said mixture with 0.05 to 12 moles of an α-olefin of at least 2 carbon atoms as the alkylating agent in solution of an organic solvent common to said amyl acrylate and α-olefin in the presence of 0.025 to 0.30 mole of an organic peroxide catalyst per mole of said α-olefin at a temperature ranging from 80° to 200° C.

7. The process of simultaneously copolymerizing and alkylating one mole of a mixture of monomers containing 0.5 mole of hexyl acrylate and 0.5 mole of N-isopropyl acrylamide which comprises heating said mixture with 0.05 to 12 moles of an α-olefin of at least 2 carbon atoms as the alkylating agent in solution of an organic solvent common to said hexyl acrylate and α-olefin in the presence of 0.025 to 0.30 mole of an organic peroxide catalyst per mole of said α-olefin at a temperature ranging from 80° to 200° C.

8. The process of simultaneously copolymerizing and alkylating one mole of a mixture of monomers containing 0.7 mole of ethyl acrylate and 0.3 mole of methyl methacrylate which comprises heating said mixture with 0.05 to 12 moles of an α-olefin of at least 2 carbon atoms as the alkylating agent in solution of an organic solvent common to said ethyl acrylate and α-olefin in the presence of 0.025 to 0.30 mole of an organic peroxide catalyst per mole of said α-olefin at a temperature ranging from 80° to 200° C.

9. The process of simultaneously copolymerizing and alkylating 2-ethylhexyl acrylate which comprises heating one mole of 2-ethylhexyl acrylate with 1.5 moles of α-eicosene in solution of methylisobutyl carbinol in the presence of 0.1 mole of di-t-butyl peroxide at a temperature of from 120°–140° C.

10. The process of simultaneously copolymerizing and alkylating ethyl acrylate which comprises heating one mole of ethyl acrylate with 1.5 moles of a mixture of α-olefins containing from 20 to 42 carbon atoms averaging to about 26 carbon atoms with an average molecular weight of 364 in solution of butanol in the presence of 0.1 of di-t-butyl peroxide at a temperature of from 120°–140° C.

11. The process of simultaneously copolymerizing and alkylating sec-butyl acrylate which comprises heating one mole of sec-butyl acrylate with one mole of α-hexadecene in solution of butanol in the presence of 0.22 mole of t-butyl peracetate at a temperature of from 110°–125° C.

12. The process of simultaneously copolymerizing and alkylating isopropyl acrylate which comprises heating one mole of isopropyl acrylate with 2.41 mole of 1-butene in solution of ethanol in the presence of 0.25 mole of t-butyl hydroperoxide at a temperature of from 125°–140° C.

13. The process of simultaneously copolymerizing and alkylating one mole of a mixture of acrylate monomers containing 0.8 mole of amyl acrylate and 0.2 mole of β-phenoxyethyl methacrylate which comprises heating said mixture with one mole of α-octadecene in solution of hexanol in the presence of 0.15 mole of di-t-butyl peroxide at a temperature of from 120°–140° C.

14. The process of simultaneously copolymerizing and alkylating one mole of a mixture of monomers containing 0.5 mole of hexyl acrylate and 0.5 mole of N-isopropyl acrylamide which comprises heating said mixture with 1.25 mole of α-tetradecene in solution of methyl isobutyl carbinol in the presence of 0.2 mole of di-t-butyl peroxide at a temperature of from 120°–145° C.

15. The process of simultaneously copolymerizing and alkylating one mole of a mixture of monomers containing 0.7 mole of ethyl acrylate and 0.3 mole of methyl methacrylate which comprises heating said mixture with one mole of α-eicosene in solution of butanol in the presence of 0.13 mole of di-t-butyl peroxide at a temperature of from 120°–126° C.

16. The product prepared in accordance with the process of claim 1.

17. The product prepared in accordance with the process of claim 2.

18. The product prepared in accordance with the process of claim 3.

19. The product prepared in accordance with the process of claim 4.

20. The product prepared in accordance with the process of claim 6.

References Cited

UNITED STATES PATENTS

| | | | |
|---|---|---|---|
| 2,456,255 | 12/1948 | Coffman et al. | 260—86.3 |
| 2,549,935 | 4/1951 | Sauer | 260—86.3 |
| 2,700,662 | 1/1955 | Young et al. | 260—86.3 |
| 2,723,970 | 11/1955 | Folt et al. | 260—86.3 |
| 2,953,551 | 9/1960 | White | 260—86.7 |
| 3,119,803 | 1/1964 | Horkowitz | 260—86.7 |
| 3,129,207 | 4/1964 | James | 260—86.3 |
| 3,218,373 | 11/1965 | Salyer | 260—86.7 |
| 3,240,757 | 3/1966 | Sterling | 260—86.3 |
| 3,274,086 | 9/1966 | Potts | 260—86.7 |

FOREIGN PATENTS

| | | |
|---|---|---|
| 590,390 | 7/1947 | Great Britain. |
| 900,969 | 7/1962 | Great Britain. |

JOSEPH L. SCHOFER, *Primary Examiner.*

H. WONG, *Assistant Examiner.*